March 12, 1968 F. AUGUSTINE 3,373,059

METHOD OF MAKING PHOTOSENSITIVE ELEMENTS

Filed Oct. 24, 1963

INVENTOR.
FRANK AUGUSTINE
BY James A. Smith
ATTORNEY

3,373,059
METHOD OF MAKING PHOTOSENSITIVE ELEMENTS

Frank Augustine, Cleveland, Ohio, assignor to Clevite Corporation, a corporation of Ohio Filed Oct. 24, 1963, Ser. No. 318,692
14 Claims. (Cl. 136—89)

This invention relates to improved photovoltaic and photoconductive cells and, particularly, to the fabrication of photosensitive cells comprising cadmium sulfide, cadmium selenide or solid solutions of both.

The photosensitivity of the semiconductive compounds cadmium sulfide and cadmium selenide both in monocrystalline and polycrystalline forms is well known and has been utilized in many commercial devices. The present invention provides an improved method of commercially fabricating photosensitive cells.

Specifically, the method contemplated by the invention is an improvement over the method of fabrication disclosed in U.S. Patent No. 3,051,839 to Carlson et al. and copending divisional application Ser. No. 158,433 filed Dec. 11, 1961, now abandoned, by the same inventors. The method contemplated is directly applicable to the fabrication of a photoconductive cell of the type and structure disclosed in said patent and, accordingly, the inventive concept will be partly described in reference thereto to illustrate a suitable application thereof.

It will be apparent, however, from the ensuing description that the invention is equally applicable to the fabrication of photovoltaic cells and thus encompasses in scope both types of photosensitive cells.

In Patent No. 3,051,839 there is disclosed and claimed a photoconductive cell comprising a plate of cadmium sulfide, cadmium selenide or a mixture of both, doped throughout its bulk with a donor impurity and having a thin layer adjacent one major surface doped with an acceptor impurity such as copper. In fabrication, thin sheets of oxidized copper are ground to a fine powder which is suspended in a non aqueous vehicle such as carbon tetrachloride. Doping is accomplished by applying to the plate surface the cuprous oxide suspension and then heating the plate in a furnace at 550° to 600° C. for one half to one hour. After diffusion is completed in this manner a typical element has a resistivity of 1,000 ohms-cm. under an illumination of 7500 foot candles from an incandescent constant source. The thickness of the doped layer is then reduced by etching and/or abrasion until a minimum light resistance condition is achieved without loss of dark resistance. The reduction in thickness is preferably carried out in small increments and by measuring the light and dark resistance after each increment of thickness is removed.

While the above-described fabrication process constituted a considerable advance in the art of fabricating photoconductive cells and results in high efficiency photoconductive cells, it possesses certain limitations which limits its application to mass production of photosensitive cells. The primary limitation is the incremental reduction in layer thickness necessary to achieve optimum resistance conditions. The process, while effective, is time consuming and adds considerably to the fabrication cost.

The incremental thickness removal utilized to achieve optimum resistance conditions is necessitated by the nonuniform diffusion resulting from the size of the cuprous oxide particles in suspension. With a cuprous oxide suspension prepared as described above the minimum average particle diameter which can be practically obtained is in the range of 20 to 100 microns. As a result of spherical propagation of diffusion with respect to each cuprous oxide particle the diffusion is discontinuous and irregular at the surface and does not become uniform until a substantial diffusion depth is achieved. Thus, it is difficult if not impossible to achieve a thin diffused layer possessing continuity and uniformity. The result is the necessity of diffusing to an average depth greater than required to achieve uniformity and then removing the surface by etching or abrasion until the optimum resistance condition is achieved.

It is a principal object of the present invention to diffuse an impurity in the surface of a cadmium sulfide or selenide plate so as to achieve directly a diffused layer thickness which provides optimum resistance characteristics.

Another object of the invention is to eliminate the need of incrementally reducing a diffused layer thickness to achieve optimum resistance conditions.

Still another object of the invention is to provide an improved cadmium sulfide and cadmium selenide photosensitive cell.

Another object of the invention is to provide an evaporated cadmium sulfide or cadmium selenide film photosensitive cell.

In accordance with the present invention controlled uniform diffusion of copper is in general accomplished by applying a film of hydrated cuprous oxide slurry to the surface of a single or multiple crystalline plate of cadmium sulfide or cadmium selenide and then subjecting the plate to heat treatment. A heat treatment of short duration (less than 60 seconds at a predetermined temperature) has been found to result in a device having a thin diffused layer and possessing photovoltaic characteristics. On the other hand a more prolonged heat treatment (up to one hour at a predetermined temperature) has been found to result in photoconductive characteristics. Thus, by selectively controlling the heat treating time and temperature a photoconductive or photovoltaic effect may be selectively produced.

The particle size of the hydrated cuprous oxide slurry is such that a uniform diffused layer may be directly produced without the need for excess diffusion and incremental layer removal. The photosensitivity of the cell thus produced is also markedly superior to that heretofore achieved in prior art photosensitive elements.

Other objects and advantages will become apparent from the following description taken in connection with the accompanying drawings wherein.

Figure 1:
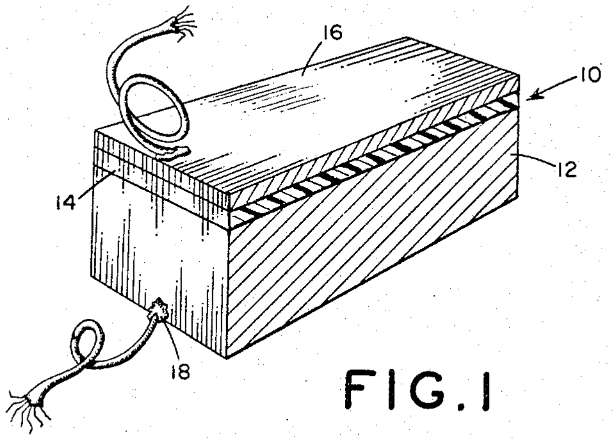
FIGURE 1 is a diagrammatic cross-sectional view of a photosensitive cell according to the present invention.

Referring to FIGURE 1 of the drawings, there is shown a photoconductive element identified generally by the reference numeral 10. The element 10 comprises a monocrystalline or polycrystalline n-type semiconductor plate 12 of cadmium sulfide, cadmium selenide or solid solutions of these compounds as represented by the equation $Cd(S_xSe_{1-}x)$. The plate 12 is provided throughout its bulk with a donor defect such as by doping with a donor impurity consisting essentially of indium, gallium, aluminum or halogens or by establishing native centers such as by removal of sulfur atoms or addition of cadmium atoms. Results achieved with a donor impurity are particularly satisfactory and the invention will be generally described in reference thereto. The concentration of the donor should be such as to impart high electrical conductivity to the crystal. The carrier concentration should be probably greater than $10^{16}$ electrons per cubic centimeter.

The crystal from which plate 12 is cut may be grown in any suitable manner. The donor may be "grown in," e.g., by growing the crystal from material "doped" with the impurity or the impurity can be incorporated subsequently such as by diffusion (or by hot treatment in a cadmium atmosphere). It is preferred to incorporate the donor impurity in the crystal during growth and, to this end, it has been found satisfactory, for example, to dope cadmium sulfide prior to crystallization with 0.10 weight percent indium sesquisulfide. During the crystallization only part of the donor impurity is incorporated in the sublimed crystals. The final crystals possess a resistivity of about 0.1 ohm-centimeter. By varying the amount of the dopant useful crystals having resistivities in the range 0.0005 to 10 ohm-cm. can be obtained.

Adjacent one major surface of the plate 12 is a very thin layer 14 which in addition to the donor impurity contains an acceptor impurity selected from the group consisting of copper, silver and gold. Layer 14 is formed by diffusing the acceptor impurity (in this case copper) into the surface of plate 12 in the manner hereinafter described. The thickness of layer 14 should be in the case of photoconductive cells of the order of $10^{-4}$ cm. and in the case of photovoltaic cells of the order of $10^{-5}$ cm.

Making large area surface contact with the layer 14 is an electrode represented diagrammatically at 16. A second electrode 18 makes ohmic contact with plate 12 at a location removed from the photoconductive layer 14. Electrode 16 may be a thin metal layer applied in any suitable manner. The only limitations on the material of electrode 16, and the manner of its application are that it make negligible contact resistance with layer 14 and be reasonably adherent thereto. Thus, electrode 16 may be applied by (1) electro-deposition from solution, (2) electroless deposition from solution, (3) pyrodecomposition of solutions of unstable salts of noble metals, e.g., gold and platinum chlorides, or (4) conducting metal powder compositions in a suitable vehicle which may be baked on or air cured. Satisfactory results have, for example, been obtained by forming electrode 16 from cadmium-indium solders or utilizing pressure contacts of indium.

Electrode 18 being in contact with the low resistance crystal plate 12 can be a relatively small contact area as shown.

Either or both electrodes 16 and 18 must be such as to allow access of photoeffective radiation to photosensitive layer 14. Ideally, electrode 16 would be transparent to such radiation if this were possible. In the absence of any known material for providing an electrode of the desired transparency and low sheet resistance, electrode 18 is formed and/or located so as to provide a minimum of obstruction to radiation passing through crystal plate 12 (i.e., from below as viewed in the drawing). Alternatively, or additionally, electrode 16 can be provided with a "window" or be arranged in the form of a "grid" to allow passage of photoeffective radiation to layer 14.

The method of fabrication of element 10 in accordance with the present invention will now be described using cadmium sulfide as an example of the semiconductor material.

The initial operation is the growth of suitably-doped cadmium sulfide crystals. For this purpose cadmium sulfide powder is mixed with 0.1 weight percent of $In_2S_3$ and presintered at about 700° C. in vacuo. This effects some purification and a desirable degree of compaction. The resulting sintered body of cadmium sulfide is then placed in a fused quartz tube, sealed under an argon atmosphere, and heated in a furnace so as to maintain the body at a temperature of about 1300° C. while a growing zone of the tube is somewhat cooler, e.g., at about 1250° C. These conditions are maintained for from two to ten days followed by slow cooling (e.g., 30° C. hour). So treated the cadmium sulfide sublimes and redeposits in the cooler region of the tube. The tube is broken to remove the crystals which are then cut into slices in any suitable manner.

To accomplish diffusion of copper into the surface of the plate 12 a slurry comprising hydrated cuprous oxide is prepared. In general the slurry is obtained by mixing in water; a source of cupric ions such as for example copper nitrate $Cu(NO_3)_2$, copper sulfate $CuSO_4$ or other copper compound preferably soluble in water; a buffering agent such as for example potassium carbonate $K_2CO_3$, sodium bicarbonate $NaHCO_3$ or other alkaline metal carbonate; a reducing agent such as for example dextrose, sucrose or hydroxylamine hydrochloride $NH_2OH \cdot HCl$; and bases such as for example ammonium hydroxide $NH_4OH$, sodium hydroxide NaOH or other alkaline metal hydroxide for pH adjustment or complexing function. Hydrated cuprous oxide is precipitated from the solution at a pH between 7 and 9. The precipitate is filtered and the cake is subsequently washed and dispersed in distilled water such that the resulting pH of the solution is between 7 and 8 but preferably close to 7.

In the preparation of the aqueous solution the following procedure was found satisfactory. The following ingredients were first selected in the following proportions:

| | Gm. |
|---|---|
| Sugar (dextrose or sucrose) | 176 |
| $(CuNO_3) \cdot 3H_2O$ | 206 |
| $K_2CO_3$ | 138 |

The above proportions of sugar and $K_2CO_3$ were dissolved in 1500 ml. of de-ionized water. The $Cu(NO_3)_2 \cdot 3H_2O$ was dissolved in 600 ml. de-ionized water and added to the solution of $K_2CO_3$ and sugar. A precipitate formed comprising initially cupric carbonate $CuCO_3$. It is believed at this stage that the sugar acts upon the cupric carbonate to reduce it to cuprous carbonate $Cu_2CO_3$ with the evolution of carbon dioxide and oxygen.

The next step was to prepare a solution of NaOH. The first salution was then heated to a temperature of approximatly 60° C. and then the NaOH solution was added slowly with constant stirring thus precipitating hydrated cuprous oxide at a pH between 7 and 9. The hydrated cuprous oxide precipitate which formed was then filtered and washed with de-ionized water until the filtrate pH is near 7 and subsequently mixed with about 100 ml. water to form an aqueous slurry.

The next step in the process was to coat by means of a brush or other suitable applicator one major surface of the plate 12 with a film of the slurry thus prepared. A chemical reaction of an undetermined nature occurs at room temperature between the hydrated cuprous oxide and the surface of the plate to which the film is applied. This reaction is evidenced by the occurrence of a bluish color on the plate surface which is believed to be the result of formation of a $Cu_2S$ film. Upon occurrence of the bluish color the excess slurry film may be washed off with water prior to heat treatment. It is believed that during subsequent heat treatment copper is diffused from the $Cu_2S$ film into the plate.

The rate of the reaction described above can be increased and the photovoltaic light conversion efficiency can be improved by heating the plate 12 to a temperature between 70 and 100° C.

The reaction which occurs between the hydrated cuprous oxide slurry and the cadmium sulfide may be used beneficially with respect to the establishment of diffused areas of predetermined configuration. The surface of plate 12 may be suitably masked for example leaving exposed desired surface areas. Application of the hydrated cuprous oxide slurry effects formation of the $Cu_2S$ film on the surface of the unmasked areas. The plate may then be washed and the masking removed. Subsequent heat treatment will effect copper diffusion into the plate and diffused areas are established corresponding to the masking configuration.

After formation of the $Cu_2S$ film, plate 12 is subjected to a heat treatment the duration and temperature of which determines the depth of copper diffusion and which in turn determines whether the resulting cell is photoconductive or photovoltaic. In general a heat treatment of less than 60 seconds at a temperature in the range of 200 to 300° C. results in a photovoltaic cell. As a specific example the formation of a large area photovoltaic cell from a vacuum evaporated cadmium sulfide film is carried out by heat treating for 14 seconds at 300° C. The resulting cell had the following characteristics:

| | | |
|---|---|---|
| Illumination (equivalent sunlight) | mw./cm.² | 100 |
| Open circuit voltage | volt | 0.45 |
| Short circuit current | milliamperes | 72 |
| Voltage at maximum power | volt | 0.32 |
| Current at maximum power | milliamperes | 54 |
| Active area | cm.² | 8.8 |
| Percent efficiency | percent | 2.0 |

Similar treatment of single crystals results in photovoltaic cells with efficiencies of up to 7 percent.

A heat treatment for a prolonged period of one minute to one hour at a temperature in the range of 300 to 600° C. results in the formation of photoconductive cells. As a specific example, a heat treatment for 17½ minutes at 450° C. of a vacuum evaporated film following application of the hydrated cuprous oxide resulted in a photoconductive cell having the following characteristics:

| | | |
|---|---|---|
| Light resistance (7500 to 10,000 foot candles illumination) | ohms | 3 |
| Dark resistance | do | $>500\times10^6$ |
| Active area | cm.² | 0.07 |

In the case of both photovoltaic and photoconductive cells the diffused layer thickness required for optimum photosensitive characteristics is achieved directly without need for excess diffusion and incremental thickness reducing. The hydrated cuprous oxide slurry utilized to coat the surface of plate 12 possesses a particle size of 1 micron or less which is sufficiently small to produce a uniform diffused layer less than $10^{-4}$ cm. in thickness.

The uniform diffusion accomplished through use of the hydrated cuprous oxide slurry allows the diffusion depth to be simply related to time and temperature. Accordingly, the diffusion depth corresponding to desired photosensitive characteristics can be readily achieved by controlling the diffusion time and temperature. The optimum resistance characteristics in the case of a photoconductive cell and the voltage and current characteristics in the case of a photovoltaic cell will depend upon the application thereof and may be selected and achieved accordingly.

Figure 2:
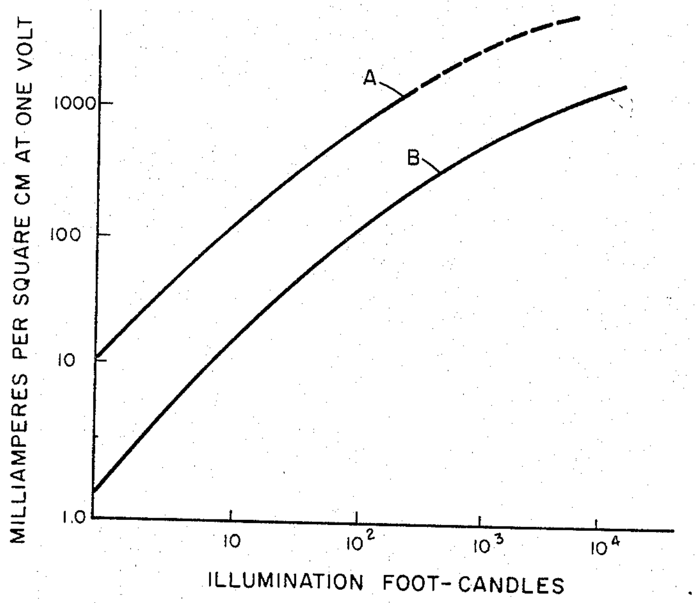
FIGURE 2 is a graph of photoconductive characteristics of a typical cell according to the invention and of a comparable prior art cell.

It has also been found that the uniformity of the diffused layer 14 inherently results in a photoconductive device having characteristics superior to prior art devices of corresponding dimensions. The markedly superior charactertistics are demonstrated graphically in FIGURE 2 wherein current density at one volt is plotted against illumination in foot candles for a typical single crystal photoconductive cell fabricated according to the present invention (Curve A) utilizing a diffusion time of five minutes at 580° C. For comparison the characteristics of a photoconductive cell fabricated according to the method disclosed in Patent No. 3,051,839 are depicted by Curve B.

Figure 3:
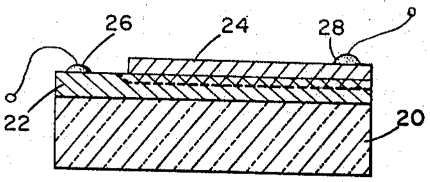
FIGURE 3 is a diagrammatic cross-sectional view illustrating another embodiment of a photosensitive cell according to the invention.

The invention possessed particular utility with respect to and in fact renders practical the fabrication of evaporated cadmium sulfide film photovoltaic and photoconductive cells of the type depicted in FIGURE 3. The cell depicted in FIGURE 3 comprises a substrate 20 of material such as glass on one surface of which is deposited a thin cadmium sulfide film 22 typically 0.03 mm. in thickness in a manner well known to those skilled in the art such as by evaporation in a vacuum. To the surface of the cadmium sulfide film 22 is applied a coating of the slurry hereinbefore described. Subsequently the cell is subjected to heat treatment, the duration and temperature being selected as described above, so as to obtain either a photoconductive or photovoltaic cell. Electrodes 24 and 26 are subsequently attached to the upper surface of the diffused layer thus formed and the film 20, respectively.

Heretofore, uniform diffusion of an impurity onto an evaporated film of cadmium sulfide or selenide has been extremely difficult to achieve. With prior art methods such as described in Patent No. 3,051,839 a diffusion depth often exceeding the thickness of an evaporated film is needed to produce diffusion uniformity. Other methods are too costly to be practical. The hydrated cuprous oxide slurry applied as described, however, results in a uniform diffused layer of less than 0.1 mm. in thickness to produce a high efficiency high quality photovoltaic cell. Similarly controlled diffusion to a greater depth results in a high quality evaporated film photoconductive cell. As the aqueous solution employed is of relatively low cost and simple to apply the process is suitable for mass production fabrication of thin evaporated film cadmium sulfide or cadmium selenide photosensitive cells. Accordingly, the invention not only provides improved process of fabricating photosensitive cells but additionally results in a cell structure heretofore impractical.

While there have been described what at present are believed to be the preferred embodiments of this invention, it will be obvious to those skilled in the art that various changes and modifications may be made therein without departing from the invention, and it is aimed, therefore, to cover in the appended claims all such changes and modifications as fall within the true spirit and scope of the invention.

It is claimed and desired to secure by Letters Patent of the United States:

1. The method of fabricating a photosensitive cell which includes the steps of: fabricating a plate of semiconductor material doped throughout its bulk with donor defects; coating one surface of the plate with an aqueous acceptor impurity slurry containing precipitated hydrated metal selected from the group consisting of copper, silver, gold; heating the plate for a predetermined time at a predetermined temperature to diffuse the acceptor impurity into the plate and establish a photosensitive diffused layer not greater in thickness than about .01 mm.; and attaching electrodes to the plate.

2. The method of fabricating a photosensitive cell as claimed in claim 1 wherein the plate is of material selected from the group consisting of cadmium sulfide, cadmium selenide and solid solutions thereof wherein the acceptor impurity is copper.

3. The method of fabricating a photosensitive cell as claimed in claim 2 wherein the active ingredient in the slurry is a hydrated oxide of copper.

4. The method of fabricating a photosensitive cell which includes the steps of: fabricating a plate of transparent substrate material; depositing a film of semiconductor material on one surface of the plate; coating the surface of the film with an aqueous acceptor impurity slurry containing precipitated hydrated metal selected from the group consisting of copper, silver, gold; and heating the plate for a predetermined time at a predetermined temperature to diffuse the acceptor impurity into the film and establish a photosensitive diffused layer not greater in thickness than about .01 mm.; and attaching electrodes to the film and the surface of the diffused layer.

5. The method of fabricating a photosensitive cell which includes the steps of: fabricating a plate of transparent substrate material; depositing a thin film of cadmium sulfide, cadmium selenide or a solid solution thereof on one surface of the plate by evaporation in a vacuum; coating the surface of the deposited film with an aqueous acceptor impurity slurry of precipitated hydrated cuprous oxide; heating the plate for a predetermined time at a predetermined temperature to diffuse the copper into the film and establish a photosensitive diffused layer not greater in thickness than about .01 mm.; and attaching electrodes to the film and surface of said diffused layer, respectively.

6. The method of diffusing copper into the surface of a plate of cadmium sulfide, cadmium selenide or solid solutions thereof, which includes the steps of: coating a surface of the plate with an aqueous acceptor impurity slurry containing precipitated hydrated cuprous oxide whereby the hydrated cuprous oxide reacts chemically with the surface of the plate; and heating the plate for a predetermined time at a predetermined temperature to affect diffusion of copper into the plate.

7. The method of diffusing copper into the surface of a plate of cadmium sulfide, cadmium selenide or solid solutions thereof which includes the steps of: mixing in water a copper compound as a source of cupric ions, a buffering agent, a reducing agent and an alkaline reagent; precipitating from the solution hydrated cuprous oxide; filtering and washing the precipitate; dispersing the precipitate in distilled water to form an aqueous acceptor impurity slurry; coating a surface of the plate with the slurry; and heating the plate for a predetermined time at a predetermined temperature to establish a photosensitive diffused layer not greater in thickness than about .01 mm.

8. The method claimed in claim 7 wherein the copper compound is selected from the group comprising copper nitrate, copper sulfate, or copper acetate.

9. The method claimed in claim 8 wherein the reducing agent is selected from the group comprising reducing sugars, and hydroxylamine hydrochloride.

10. The method claimed in claim 9 wherein the buffering agent comprises alkaline metal carbonates.

11. The method claimed in claim 10 wherein the alkaline reagent comprises alkaline metal hydroxides.

12. The method claimed in claim 7 wherein the hydrated cuprous oxide is precipitated from the solution at a pH between 7 and 9 and the pH of the slurry solution is between 7 and 8.

13. The method as claimed in claim 9 wherein the reducing sugar is selected from the group consisting of dextrose and sucrose.

14. The method of preparing a photoconductive cell of low light resistance and high current carrying capacity which includes the steps of: preparing a layer of n-type semiconductor material selected from the group comprising cadmium sulfide, cadmium selenide and solid solutions thereof; doping a predetermined thickness of the layer not to exceed about .01 mm. by exposing one surface of the n-type semiconductor layer to an aqueous acceptor impurity slurry of precipitated cuprous hydrate particles having a particle size less than 1 micron; and heat treating said layer at a temperature between 150° and 600° C.

References Cited

UNITED STATES PATENTS

| | | | |
|---|---|---|---|
| 2,820,841 | 1/1958 | Carlson et al. | 136—89 |
| 3,051,839 | 8/1962 | Carlson et al. | 250—211 |
| 3,095,324 | 6/1963 | Cusano et al. | 117—215 |
| 3,191,045 | 6/1965 | Wilmotte | 117—215 X |

ALLEN B. CURTIS, *Primary Examiner.*